United States Patent
Floden et al.

(10) Patent No.: US 12,416,373 B2
(45) Date of Patent: Sep. 16, 2025

(54) SYSTEM AND METHOD FOR COUPLING PIPES

(71) Applicant: MOUNTAIN BUFFALO PRODUCTS INC., Edmonton (CA)

(72) Inventors: Chris Floden, Edmonton (CA); Ronald Lechelt, Edmonton (CA)

( * ) Notice: Subject to any disclaimer, the term of this patent is extended or adjusted under 35 U.S.C. 154(b) by 0 days.

(21) Appl. No.: 17/336,286

(22) Filed: Jun. 1, 2021

(65) Prior Publication Data

US 2022/0018473 A1 Jan. 20, 2022

Related U.S. Application Data

(60) Provisional application No. 63/147,706, filed on Feb. 9, 2021, provisional application No. 63/052,874, filed on Jul. 16, 2020.

(51) Int. Cl.
*F16L 21/06* (2006.01)
*F16L 19/02* (2006.01)

(52) U.S. Cl.
CPC ......... *F16L 21/065* (2013.01); *F16L 19/0218* (2013.01)

(58) Field of Classification Search
CPC ..... F16L 21/065; F16L 19/0218; F16L 23/08; F16L 23/18; F16L 17/04
USPC ................... 285/111, 112, 110, 367
See application file for complete search history.

(56) References Cited

U.S. PATENT DOCUMENTS

| | | | | |
|---|---|---|---|---|
| 2,295,510 A * | 9/1942 | Longenecker | .......... | F16L 11/18 285/94 |
| 2,962,305 A * | 11/1960 | McCarthy | ............... | F16L 17/04 285/112 |
| 4,039,210 A * | 8/1977 | Wood | ....................... | F16L 17/04 285/112 |
| 4,861,075 A * | 8/1989 | Pepi | ....................... | F16L 17/04 285/112 |
| 5,282,654 A * | 2/1994 | Hendrickson | ........... | F16L 17/04 285/112 |
| 6,467,812 B1 * | 10/2002 | Klemm | .................... | F16L 57/06 285/112 |
| 6,921,115 B2 * | 7/2005 | Gill | ........................ | F16L 23/16 285/110 |
| 2003/0062718 A1 * | 4/2003 | Radzik | .................... | F16L 17/04 285/112 |
| 2006/0208486 A1 * | 9/2006 | Kim | ........................ | F16L 21/06 285/364 |
| 2015/0204473 A1 * | 7/2015 | Svetlik | .................... | F16L 23/08 285/367 |

(Continued)

FOREIGN PATENT DOCUMENTS

JP 2001065758 A * 3/2001 .............. F16L 17/04

OTHER PUBLICATIONS

For (Year: 2001).*

*Primary Examiner* — David Bochna

(57) ABSTRACT

A system for coupling pipe segments endwise to each other comprise a tubular hub secured proximate to an end face of each pipe segment, each hub having a radially extending mounting block therearound, a seal extending around the hubs between the mounting blocks and a clamping ring sized to extend around the tubular hub, said clamping ring having a radially extending positioning lip at each end of wherein the positioning lips surround the mounting blocks.

19 Claims, 10 Drawing Sheets

(56) References Cited

U.S. PATENT DOCUMENTS

2016/0076678 A1\* 3/2016 Wiedemeier .......... F16L 21/065
            285/65
2016/0273689 A1\* 9/2016 Considine, Jr. ....... F16L 21/065
2017/0328500 A1\* 11/2017 Bowman ................. F16L 21/06

\* cited by examiner

SYSTEM AND METHOD FOR COUPLING PIPES

CROSS REFERENCE TO RELATED APPLICATIONS

This application claims priority to US provisional patent application entitled "System and Method for Coupling Pipes" filed on Jul. 16, 2020 as application No. 63/052,874 and US provisional patent application entitled "System and Method for Coupling Pipes" filed on Feb. 9, 2021 as application No. 63/147,706.

BACKGROUND

1. Technical Field

This disclosure relates generally to pipes and in particular to a method and system for coupling pipes.

2. Description of Related Art

In conventional pipeline construction, the pipeline is formed by endwise connecting a plurality of pipe segments together to form a continuous conduit. Such pipe segments are commonly connected through a variety of means including welding or using couplers. It will be appreciated that welding pipe segments requires a significant level of welder skill to ensure a strong liquid impervious seal between the pipe segments.

Some attempts have been made to provide couplers for connecting pipe segments together. However such previous solutions have been difficult to locate and seal against the ends of the pipe segments. In particular, such previous couplers have relied upon a clamping segments secure around each end of the pipes with a sealing element thereunder. However some of such systems have been designed to engage a rings around pipe ends to hold the ends of the pipes together. Such designs have disadvantageously however hidden the surfaces to be mated for coupling the pipes together within the interior of the coupling thereby rendering connection difficult. Examples of such systems may be found in U.S. Pat. No. 8,136,847 to Madara et al.

Other current designs have provided coupling segments with lips to engage within grooves of the pipes. Disadvantageously, such designs have relied on containing the seal within a cavity in the clamping ring such that the clamping segments compress the seal radially inward upon the pipe. It will be appreciated that such location of the seal within the clamping ring increases the possibility of the seal moving longitudinally out of position and also increases the possibility of a portion of the seal being damaged when compressed between the clamping segments and the pipe. Examples of such designs may be found in U.S. Pat. No. 8,500,174 to Gibb.

SUMMARY OF THE DISCLOSURE

According to a first embodiment, there is disclosed a system for coupling pipe segments endwise to each other comprising a tubular hub secured proximate to an end face of each pipe segment, each hub having a radially extending mounting block therearound, a seal extending around the hubs between the mounting blocks and a clamping ring sized to extend around the tubular hub, said clamping ring having a radially extending positioning lip at each end of wherein the positioning lips surround the mounting blocks.

The mounting blocks extends between inner and outer annular end surfaces. The inner end surface have an inclined surface angularly oriented towards the pipe segment. The outer end surface include a transition surface at an outer radial corner thereof. The transition surface are selected from the group consisting of chamfered and radiused.

The hub further includes a positioning wall extending radially therefrom parallel to and spaced apart from the mounting block. The positioning lips on the clamping ring are positioned to be received in an annular groove between the positioning wall and the outer end surface of the mounting blocks.

The positioning lip may extend between inner and outer annular surfaces. The outer surfaces may be inclined relative to perpendicular to the pipe axis so as to guide the positioning lips into the annular grooves.

The clamping ring may be formed of a pair of connectable semi-circular segments. The semi-circular segments are connectable to each other by fasteners.

The seal may extend between first and second end surfaces. The first and second end surfaces may include an inclined portion corresponding to the inner surfaces of the mounting blocks. The first and second end surfaces may include an annular portion outward of the inclined portion. The clamping ring includes an inwardly facing surface adapted to span the mounting blocks and compress the seal between the mounting blocks.

According to a further embodiment, there is disclosed a method of coupling pipe segments endwise to each other comprising securing a tubular hub proximate to an end face of each pipe segment, each hub having a radially extending mounting block therearound, locating a seal around the hubs between the mounting blocks and compressibly securing a clamping ring around the tubular hub, wherein the clamping ring have a radially extending positioning lip at each end of wherein the positioning lips surround the mounting blocks.

Other aspects and features of the present disclosure will become apparent to those ordinarily skilled in the art upon review of the following description of specific embodiments in conjunction with the accompanying figures.

BRIEF DESCRIPTION OF THE DRAWINGS

The accompanying drawings constitute part of the disclosure. Each drawing illustrates exemplary aspects wherein similar characters of reference denote corresponding parts in each view.

DETAILED DESCRIPTION

Figure 1:
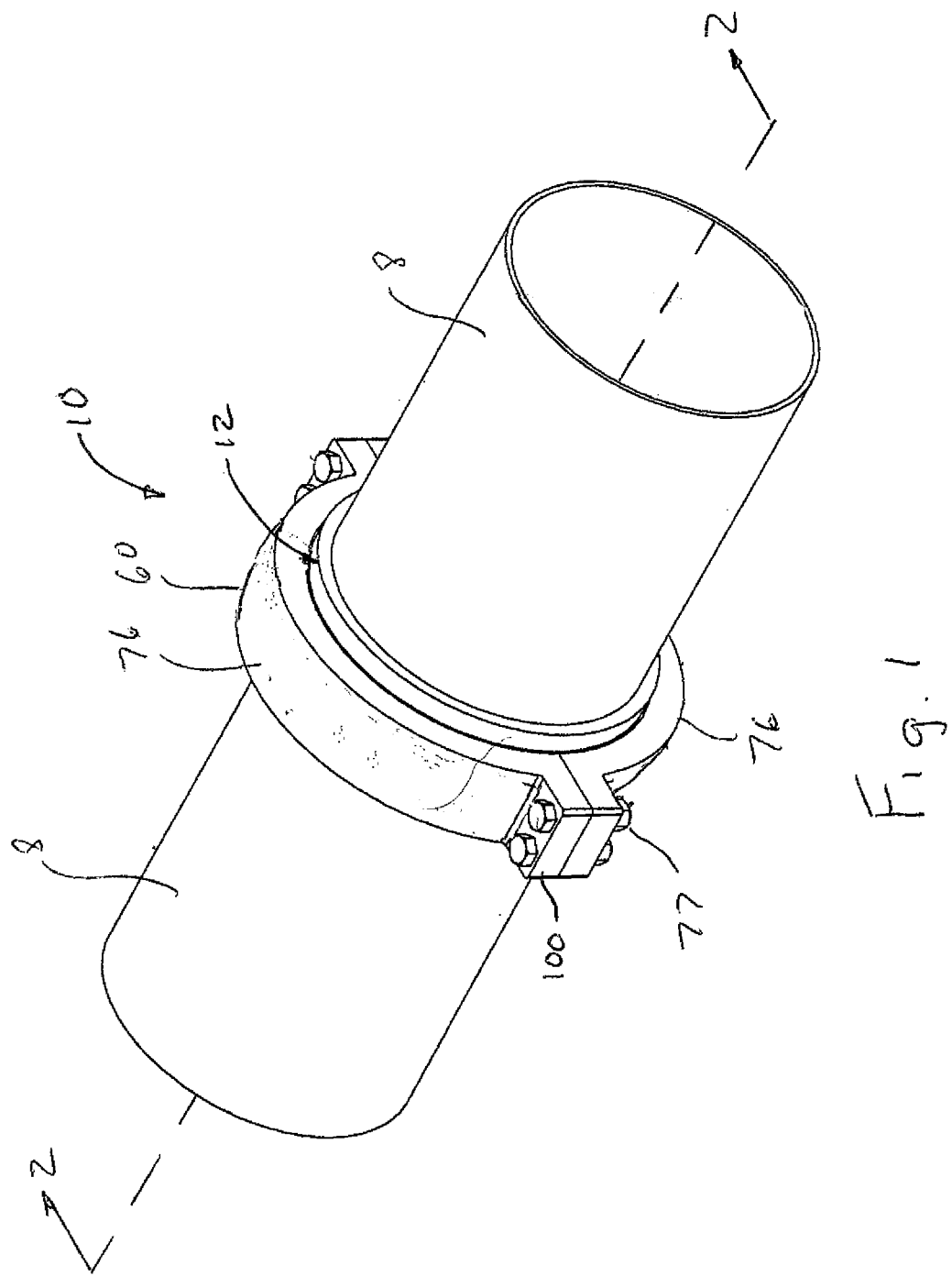
FIG. 1 is a perspective view of an apparatus for coupling two pipe portions together according to a first embodiment.
Figure 2:
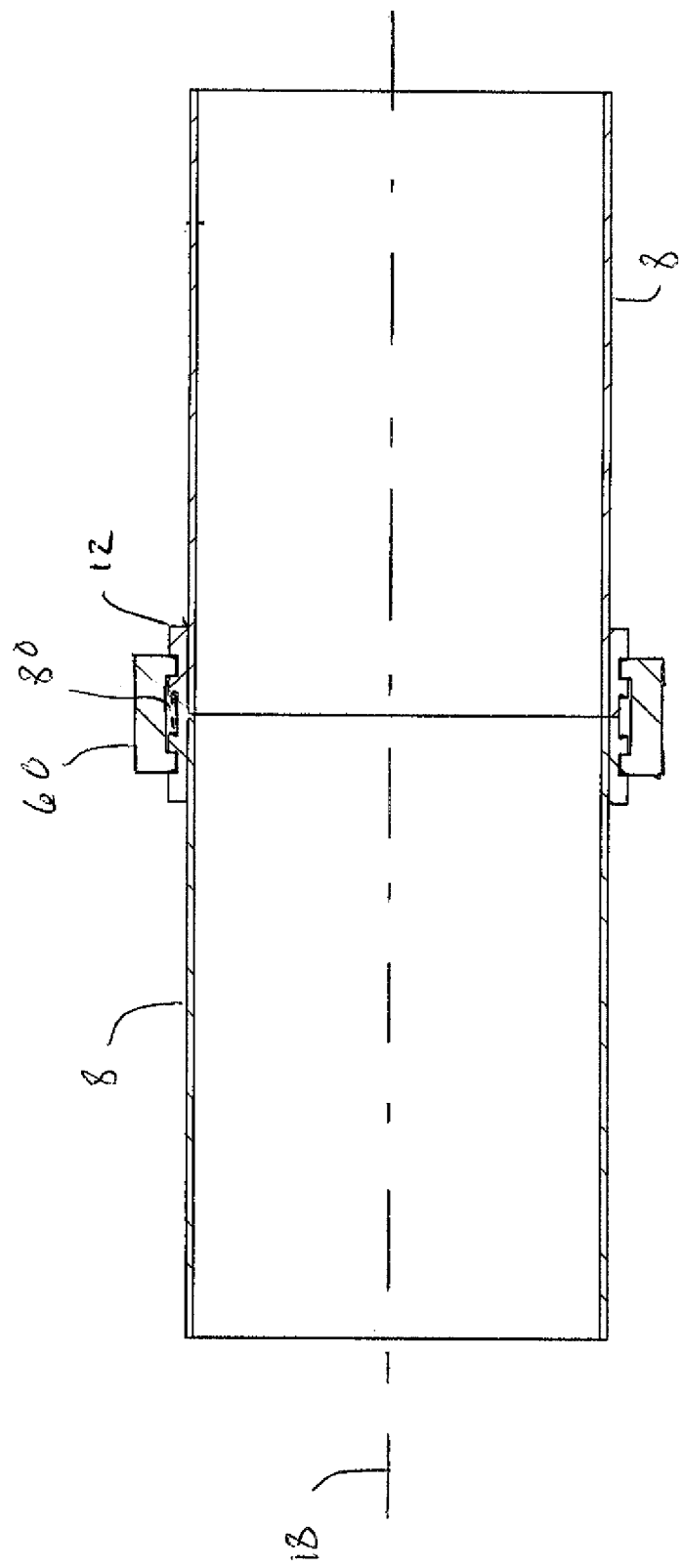
FIG. 2 is a cross sectional view of the apparatus and pipe portions of FIG. 1 as taken along the line 2-2.

Aspects of the present disclosure are now described with reference to exemplary apparatuses, methods and systems. Referring to FIG. 1, an exemplary apparatus for coupling pipes according to a first embodiment is shown generally at 10. In particular, as illustrated in FIG. 1, the apparatus 10 couples a pair of pipe segments 8 to each other in a sealed manner so as to form a continuous pipeline therewith. It will be appreciated that a plurality of pipe segments 8 and apparatuses 10 will be utilized to form a pipeline of a desired length. It will be furthermore appreciated that the diameters of the pipe segments 8 and apparatus 10 may be selected to provide the pipeline capacity as is required for that particular pipeline and that therefore any diameter of pipe segment and apparatus 10 may be selected to fulfil those needs.

The apparatus 10 comprises a pair of hubs 12 secured to adjacent ends of the pipe segments 8 which are then coupled together by a clamping ring 60 to sealably secure the pipe segments 8. The apparatus further includes a seal ring 80 between the clamping ring 60 and the hubs 12 so as to provide a fluid impervious connection between the pipe segments 8.

Figure 3:
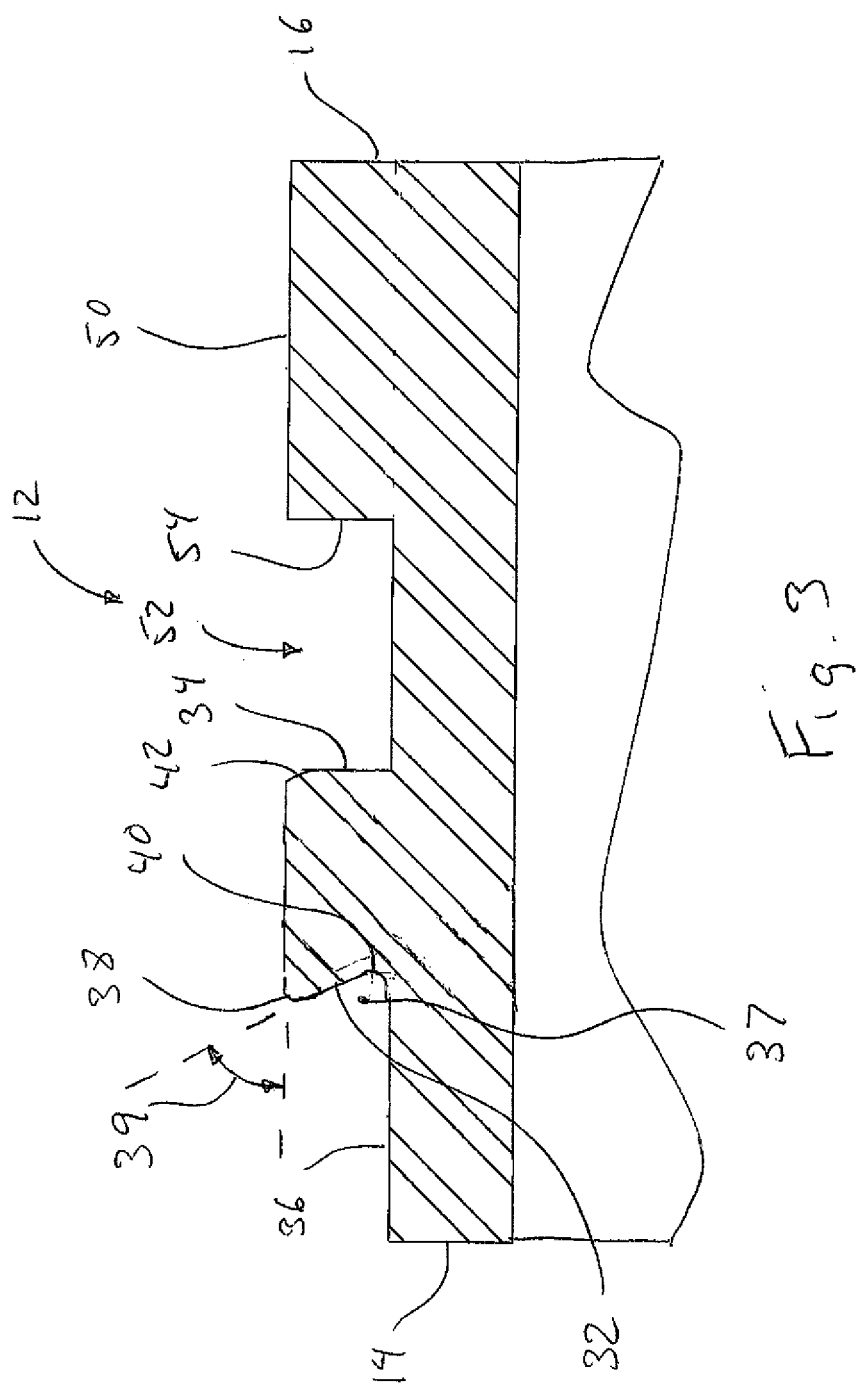
FIG. 3 is a detailed cross sectional view of one of the hubs of the apparatus of FIG. 1.

Turning now to FIG. 3, each hub 12 comprises a cylindrical body extending along an axis 18 of the pipe segments between inside and outside edges, 14 and 16, respectively. The hub 12 includes an inner surface 18 sized to correspond to an outer diameter of the pipe segment so as to be closely and slidably received thereon. Once located on the pipe segment 8 with the inside edge 14 proximate to an end of the pipe segment, the hub 12 is welded or otherwise secured to the pipe segment. It will be appreciated that the hub 12 may be located proximate to an end surface of the pipe segment 8 or spaced back therefrom by a particular distance so as to secure the pipe segments together with a desired space between the end surfaces once the clamping ring 60 is secured thereover as will be set out further below.

The hub 12 includes a mounting block 30 extending radially therearound. The mounting block 30 extends between inner and outer annular surfaces, 32 and 34, respectively. The inner surface 32 is oriented towards the inside edge 14 with a cylindrical seal supporting surface 36 therebetween. The seal supporting surface 36 may be substantially cylindrical and parallel to the axis of the pipes. Optionally the seal supporting surface 36 may include a texture such as spiralled or roughened to assist with engagement of the seal 80. The inner surface 32 is angled relative to the axis 18 by an incline angle generally indicated at 39 selected to be between 40 and 80 degrees although other angles may be useful as well. In such a manner the inner surface forms an overhang region generally indicated at 37 located radially between the seal supporting surface 36 and the inner surface 32 which contains and holds the seal 80 in the desired position as will be more fully described below. The outer surface 34 is substantially orthogonal to the axis 18. The top and bottom edges, 38 and 40, respectively, of the inner surface 32 may be chamfered or radiused so as to correspond to the shape of the seal located therein and reduce stress or compression locations. Additionally, the top edge 42 of the outer surface 34 may be profiled to assist with guiding lips on the clamping ring 60 therepast. The mounting blocks 30 include an outer radial surface 31 extending between the inner surface 32 and outer surface 34. The outer radial surface 31 is substantially cylindrical and parallel to the axis 18.

The seal supporting surface 36 in combination with the radiused bottom edge 40 and inclined inner surface 32 as illustrated in FIG. 3 may be particularly suited to receiving a seal 80 in a snug fit between a pair of opposed hubs 12 on opposed pipe segments as will be described more fully below. In particular, the profiled surface may be chamfered or radiused as are commonly known. As such, a visual representation will be provided to a worker as to whether the proper longitudinal spacing between the hubs 12 has been achieved before the clamping ring 60 is secured thereover. It will be appreciated that ensuring proper longitudinal spacing between the hubs 12 prior to attaching the clamping ring 60 will ensure that the seal 80 is fully contained between the mounting blocks 30 so as to prevent a portion of the seal from being pinched between the clamping ring 60 and the hubs 12 as the clamping ring 60 is secured thereover.

As illustrated in FIG. 3, the hub 12 may also include a positioning wall 50 extending therefrom. The positioning wall 50 includes a guide surface 54 which is parallel to and spaced apart from the outer surface 34 of the mounting block 30 so as to form a circumferential groove 52 therebetween. In particular the guide surface is substantially orthogonal to the axis 18 and spaced apart from the outer surface 34 of the mounting block 30 such that the groove 52 is operable to receive a positioning lip 68 of the clamping ring 60 (as described below) in surface engagement with the outside surface 34. In such an position the guide surface 54 will be spaced apart from the positioning lip 68 by a gap distance generally indicated at 7 as illustrated in in FIG. 9. In operation the groove 52 may be formed to have a width between the outer surface 34 and the guide surface 54 sufficient to provide a gap distance of between 0.090 and 0.1000 inches (2.2 and 2.8 mm). This gap distance 7 prevents the positioning lip 68 (as described below) from being frictionally compressed within the groove while still guiding the positioning lip 68 into the groove 52.

Figure 4:
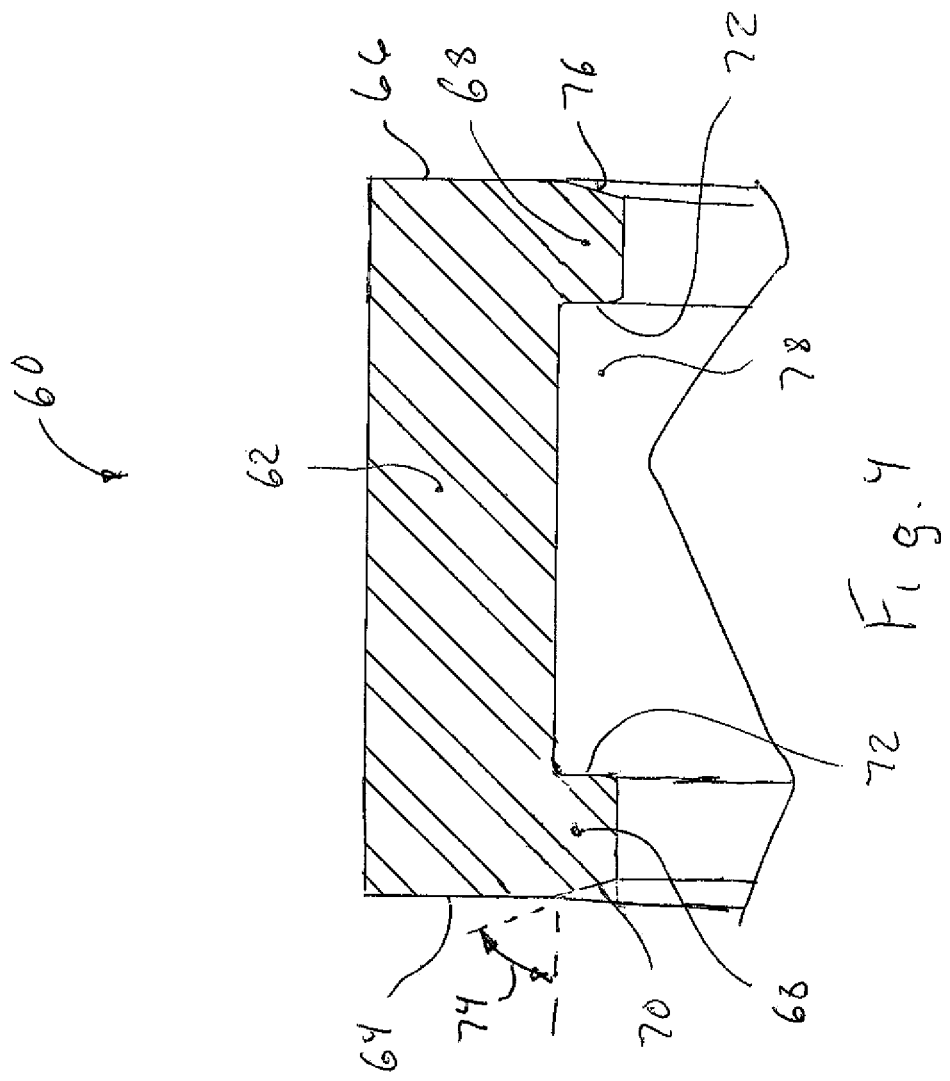
FIG. 4 is a cross sectional view of the clamping ring of the apparatus of Figure.
Figure 9:
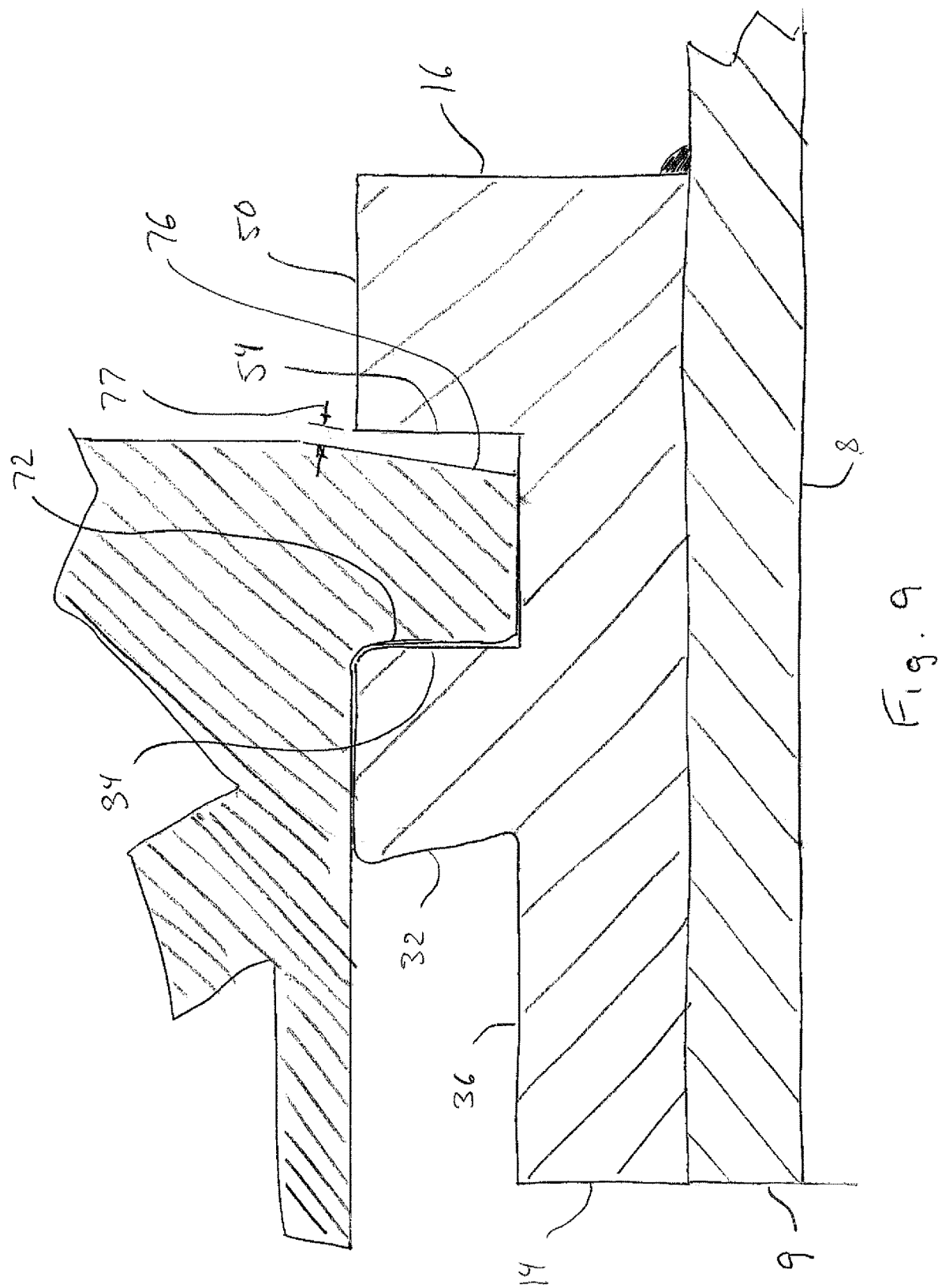
FIG. 9 is a detailed cross sectional view of the positioning wall of the clamping ring located within the annular groove of the hub.
Figure 10:
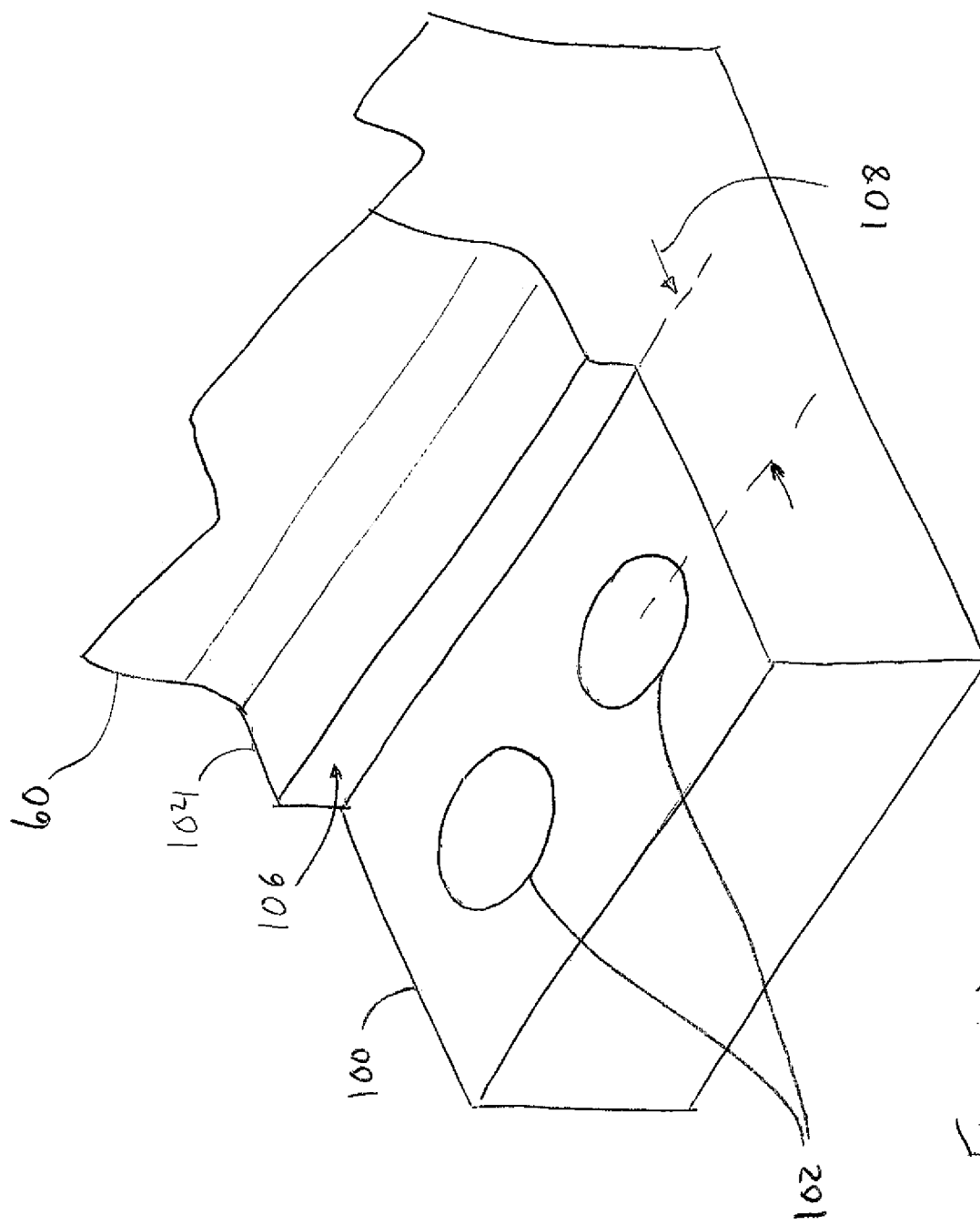
FIG. 10 is a detailed perspective view of the coupling blocks of the clamping ring segments according to a further embodiment.

Turning now to FIG. 4, a cross sectional view one side of the clamping ring 60 is illustrated. The clamping ring 60 comprises a cylindrical body 62 extending between first and second ends, 64 and 66, respectively. The clamping ring 60 includes a positioning lip 68 adjacent to each of the first and second ends 64 and 66. Each positioning lip 68 extends radially inward from the cylindrical body between outside 70 and inside 72, surfaces. The outside surface 70 may be angled by an angle generally indicated at 74 relative to the axis so as to be operable to engage against the guide surface 54 of the positioning wall 50 and guide the positioning lip 68 into the groove 52. In practice an angle 74 selected to be between 12.5 and 20 degrees has been found to be useful although it will be appreciated that other angles may be useful as well. It will also be appreciated that other angles outside this range may also be useful including orthogonal to the axis 18. The inside surface 72 is substantially orthogonal to the axis 18 so as to engage against the outer surface 34 of the positioning block 30. Furthermore the bottom edges of each of the inside and outside surfaces 72 and 76 may be chamfered or radiused to assist with introduction of the positioning lip 68 into the groove 52. As illustrated in FIG. 3, the positioning lips 68 and cylindrical body form an annular cavity 78 therebetween which will contain and compress the seal 80 when the clamping ring 60 is secured thereover. The clamping ring 60 includes an inner radial surface 79 extending between the positioning lips 68 also defining the annular cavity. The inner radial surface 79 is substantially cylindrical and parallel to the axis 18 and aligned with the outer radial surface 31 of the mounting blocks 30 when connected thereto. In particular as illustrated in FIG. 9, the inner radial surface 79 may engage upon the outer radial surface of the mounting blocks or substantially close thereto. As illustrated in FIG. 1, the clamping ring 60 may be formed of one or more ring segments 76 fastened together with bolts 77 or the like. The clamping rings 60 may include coupling blocks 100 at the ends thereof through which the bolts 77 are passed. As illustrated in FIG. 10, the coupling blocks 100 include at least one bolt hole 102 therethrough sized to pass a bolt of a suitable size for coupling the ring segments together. The coupling blocks 100 may include a ledge or step 104 formed therein at a position offset from the bolt holes 102. The ledge 104 includes a retaining face 106 extending substantially parallel to an axis of the bolt holes. The retaining face 106 is spaced away from the bolt holes 102 by a distance selected to engage upon one face of a bolt 77 passed through the bolt holes 102 so as to prevent rotation thereof. It will be appreciated that this distance may be selected to permit the use of standard bolts.

Figure 5:
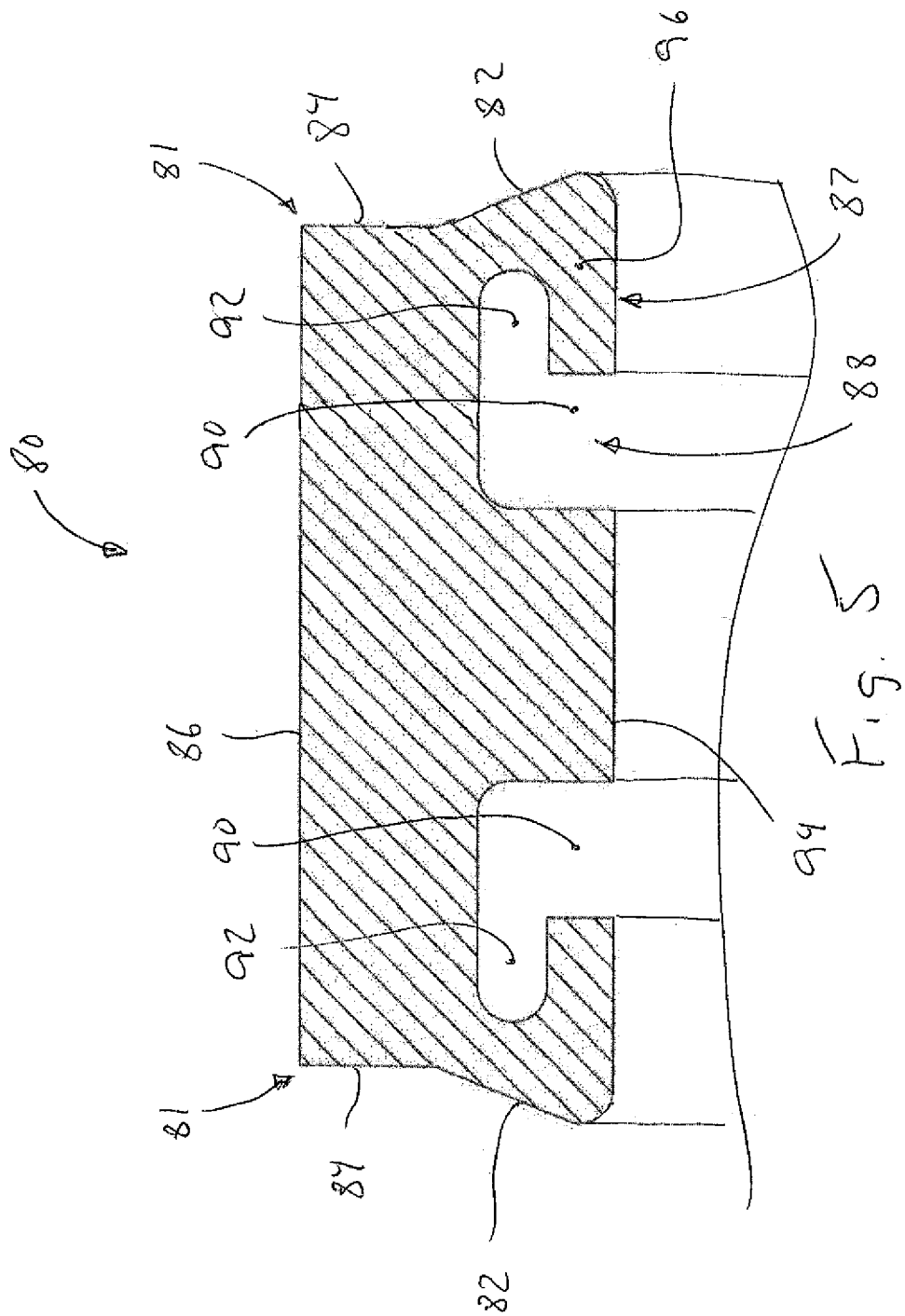
FIG. 5 is a cross sectional view of the seal of the apparatus of Figure.

Turning now to FIG. 5, the seal comprises a ring-shaped member extending between end edges 81 and an inner 87 and outer 86 surface. The edge surfaces 81 are formed of a first inner portion 82 which may be angled relative to the axis 18 so as to correspond to the angle 39 of the inner surface 32 of the mounting blocks. An outer portion 84 of the end surfaces 81 are substantially orthogonal to the axis 18. The inner surface 87 is sized to correspond to the diameter of the seal supporting surface 36 so as to be closely located therearound. The length of the seal 80 is selected to correspond to the desired distance between the inner surfaces 32 with the desired gap between the ends of the pipe segments such that the first inner portion 82 is retained or captured under the overhang of the inner surfaces 32. The seal 80 includes a pair of grooves 88 proximate to each end having a first radial portion 90 and a second longitudinal portion 92 forming a pair of inwardly oriented rings 96 which extend towards each other. The grooves 88 also form a central lip 94 extending radially inwardly therefrom.

Figure 6:
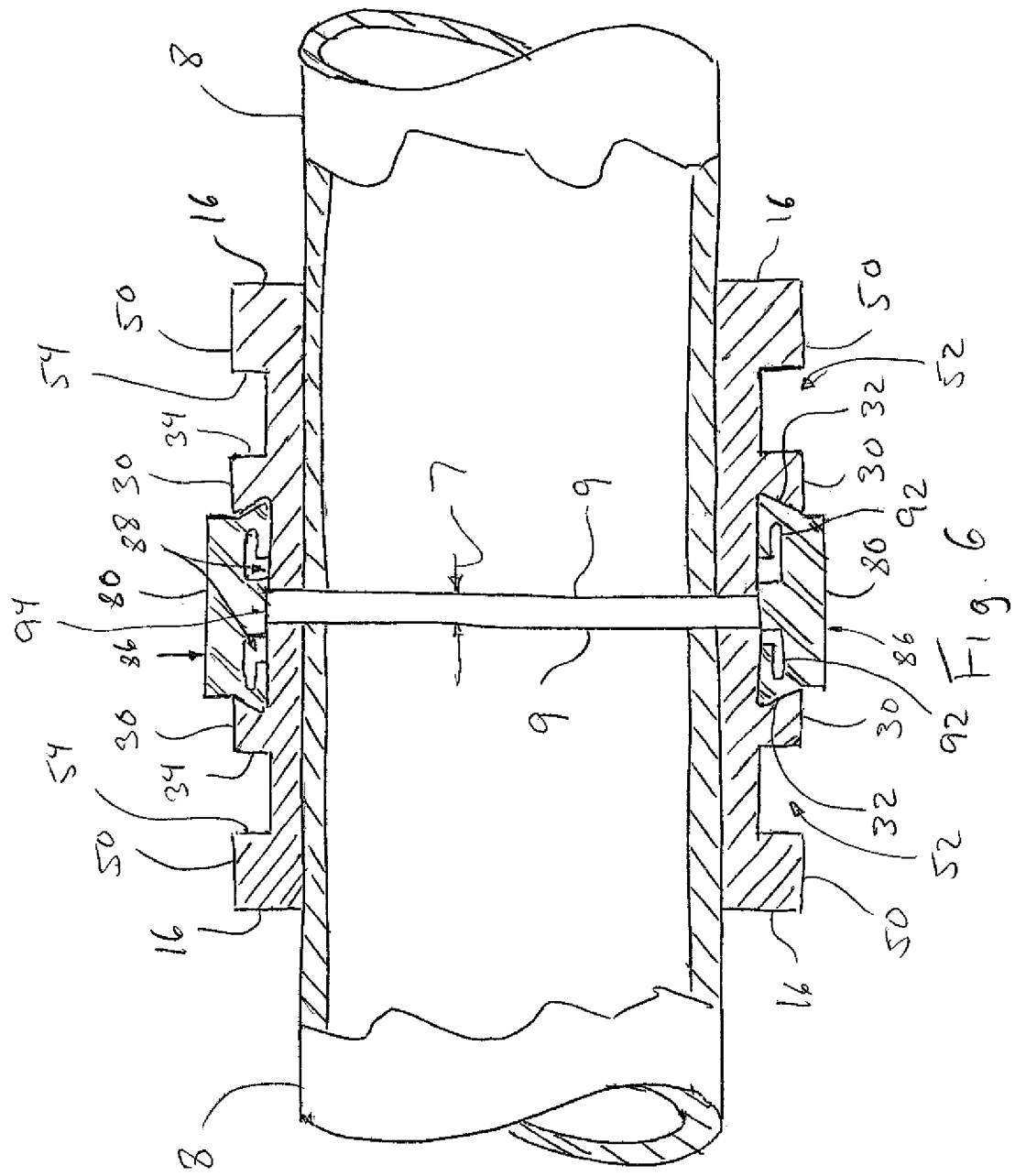
FIG. 6 is a cross sectional view of the seal located between two hubs of the apparatus of FIG. 1 located around the ends of two pipes to be coupled together.

In operation, as set out above, the hubs 12 are secured to the ends of the pipe segments 8 and welded or otherwise secured thereon. The hubs 12 are secured at the ends 9 of the pipes 8 as illustrated in FIG. 6. In particular, the hubs 12 may be spaced back from the ends 9 of the pipes 8 so as to maintain a desired pipe gap 7 between the ends 9 of the pipe. By way of non-limiting example, the distance between the outer surfaces 34 should be selected such that when the seal 80 is located between the inner surfaces 32, the pipe gap 7 between the pipe ends 9 is maintained below a predetermined distance due to the contact of the inside surfaces 72 of the clamping ring 60 bearing upon the outer surfaces 34 of the mounting blocks 30. By way of non-limiting example, the pipe gap 7 maybe limited to up to 0.15 inches (4 mm). Furthermore, the positioning wall 50 and in particular the guide surface 54 and the outer surface 34 are spaced apart from a first end 14 of the hub 12 so as to maintain the pipe gap 7 below a desired distance when the position lips 68 are located within the groove 52 with the inside surfaces 72 of the positioning lips 68 are in engagement upon the outer surface 34 of the mounting blocks 30.

Figure 7:
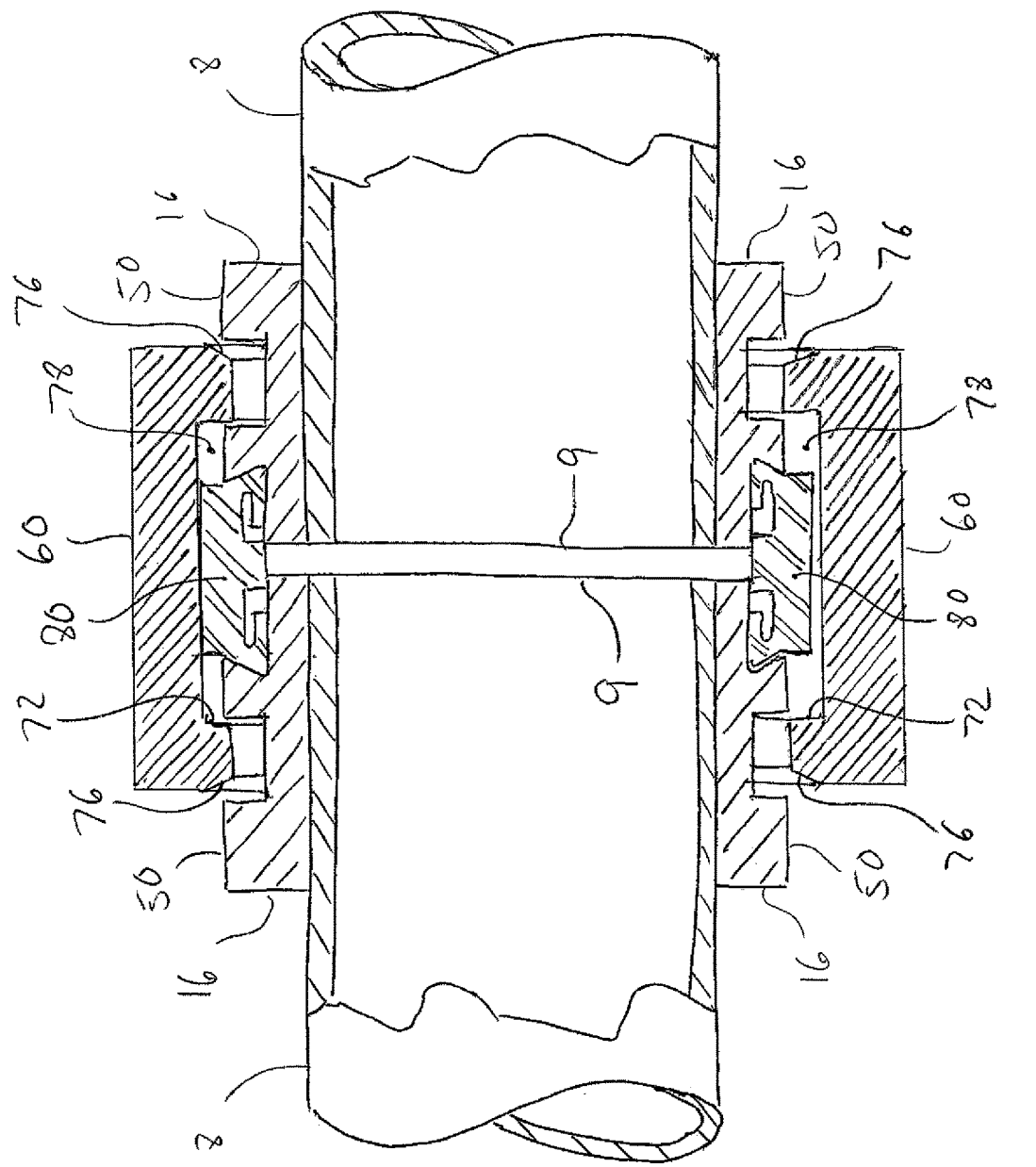
FIG. 7 is a cross sectional view of the pipes of FIG. 6 with hubs and seal located therearound and a clamping ring positioned thereover at an initial position of coupling.
Figure 8:
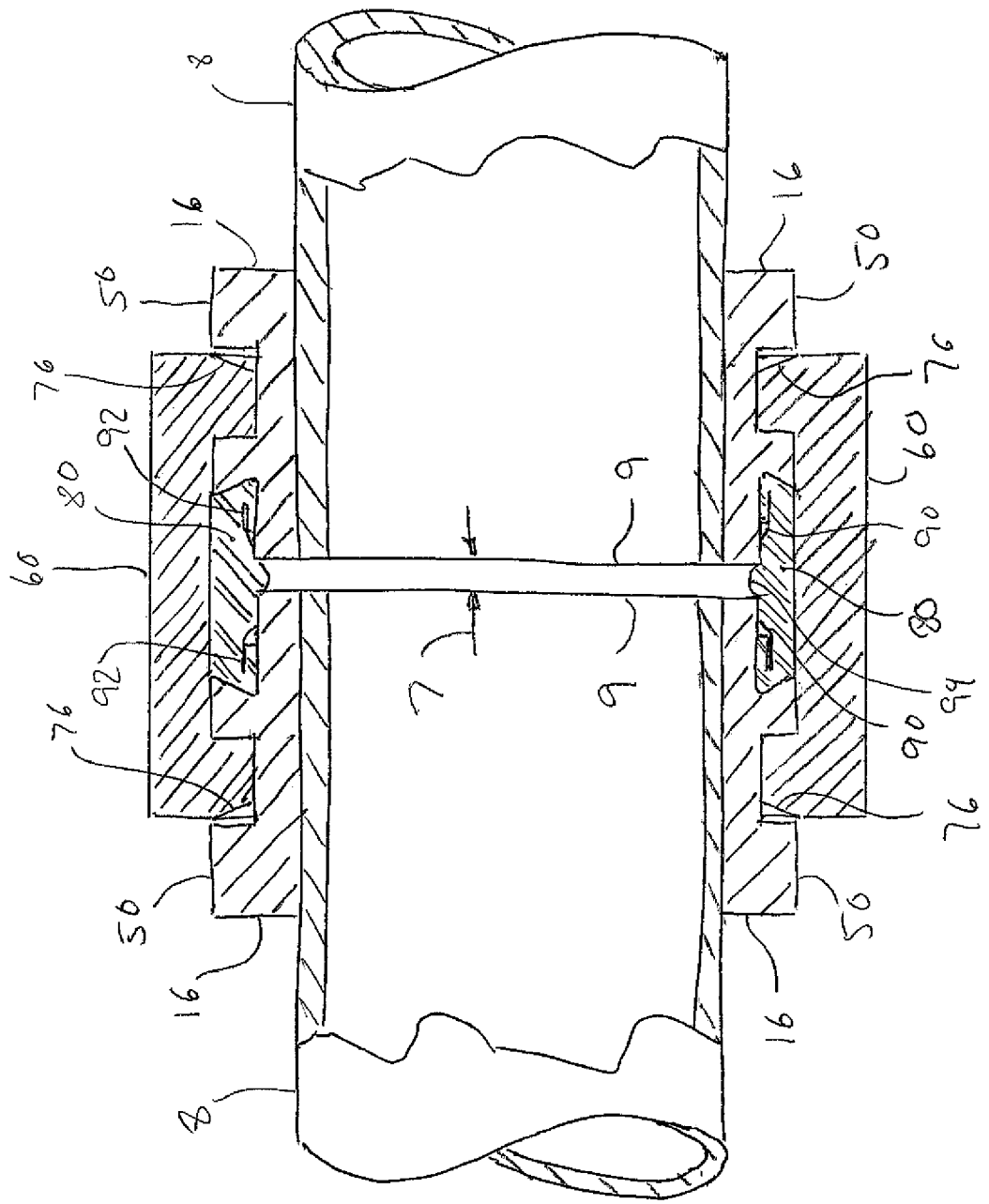
FIG. 8 is a cross sectional view of the apparatus of FIG. 7 at a final position of coupling.

Thereafter, the seal 80 may be located over each hub 12 so as to be positioned around the seal supporting surface 36 as the pipe segments 8 are first brought proximate to each other in their desired positions as illustrated in FIG. 6. In particular, the seal 80 is located between the inner surfaces 32 in a snug fit so as to provide a visual indication to a worker if the proper spacing has been achieved. In such a position, the seal 80 will be located between and in contact with the inner surfaces 32. The clamping ring 60 may then be positioned around the hubs 12 and seal 80 as illustrated in FIG. 7 such that the cavity 78 contains the seal and the positioning lips 68 are guided into the grooves 52 of the hubs.

It will be appreciated that during some installations, the pipes 8 may be initially located farther apart than desired such that the gap 7 is greater than the required distance. Such spacing may be observed by a corresponding gap between the seal 80 and the inner surfaces 32 of the mounting block by a worker. The pipes 8 may then be moved closer together as before application of the clamping ring 60. It will be appreciated that the profiled edge 42 on the mounting block 30 as well as a corresponding radiused or chamfered edge on the inner corner of the positioning lip 68 will assist to guiding positioning lip 68 into the groove 52 with reduced damage thereto such that the inside surface 72 bears on the contact with the outer surface 34 to achieve the desired gap 7 distance.

As the clamping ring 60 is tightened around the hubs 12 and seal, the clamping ring bear against the outer surface 86 of the seal 80 so as to compress the seal. While being compressed, the grooves 88 are compressed and narrowed and the central lip 94 will be pressed against the ends 9 of the pipes such that a portion may be extruded or pressed into the gap 7 to form a seal between the end surfaces of the pipe segments.

While specific embodiments have been described and illustrated, such embodiments should be considered illustrative only and not as limiting the disclosure as construed in accordance with the accompanying claims.

What is claimed is:

1. A system for coupling pipe segments endwise to each other comprising:
    a tubular hub securable annularly around and proximate to an end face of each pipe segment, each hub extending between first and second ends and having a radially extending mounting block therearound, each hub includes an integrally formed seal supporting surface located between the mounting block and the first end of the tubular hub;
    a seal positionable around each seal supporting surface between the mounting blocks; and
    a clamping ring sized to extend around the tubular hub, said clamping ring having a radially extending positioning lip at each end of wherein the positioning lips surround the mounting blocks,
    wherein the hub and seal surround the pipe at a common longitudinal position therealong.

2. The system of claim 1 wherein the mounting blocks extends between inner and outer annular end surfaces.

3. The system of claim 2 wherein the inner end surface have an inclined surface angularly oriented towards the pipe segment.

4. The system of claim 3 wherein the outer end surface include a transition surface at an outer radial corner thereof.

5. The system of claim 4 wherein the transition surface are selected from the group consisting of chamfered and radiused.

6. The system of claim 1 wherein the hub further includes a positioning wall extending radially therefrom parallel to and spaced apart from the mounting block.

7. The system of claim 6 wherein the positioning lips on the clamping ring are positioned to be received in an annular groove between the positioning wall and the outer end surface of the mounting blocks.

8. The system of claim 7 wherein the positioning lip extends between inner and outer annular surfaces.

9. The system of claim 8 wherein the outer surfaces is inclined relative to perpendicular to the pipe axis so as to guide the positioning lips into the annular grooves.

10. The system of claim 1 wherein the clamping ring is formed of a pair of connectable semi-circular segments.

11. The system of claim 10 wherein the semi-circular segments are connectable to each other by fasteners.

12. The system of claim 1 wherein the seal extends between first and second edge surfaces.

13. The system of claim 12 wherein the first and second edge surfaces include an inclined portion corresponding to the inner surfaces of the mounting blocks.

14. The system of claim 13 wherein the first and second edge surfaces include an annular portion outward of the inclined portion.

15. The system of claim 1 wherein the clamping ring includes an inwardly facing surface adapted to span the mounting blocks and compress the seal between the mounting blocks.

16. A method of coupling pipe segments endwise to each other comprising:
   securing a tubular hub proximate to an end face of each pipe segment, each hub extending between first and second ends and having a radially extending mounting block therearound, each hub includes an integrally formed seal supporting surface located between the mounting block and the first end of the of tubular hub;
   positioning a seal around each seal supporting surface between the mounting blocks; and
   compressibly securing a clamping ring around the tubular hub, wherein the clamping ring have a radially extending positioning lip at each end of wherein the positioning lips surround the mounting blocks,
   wherein the hub and seal surround the pipe at a common longitudinal position therealong.

17. A system for coupling pipe segments endwise to each other comprising:
   a tubular hub securable annularly around and proximate to an end face of each pipe segment, each hub having a radially extending mounting block therearound;
   a seal positionable around the hubs between the mounting blocks; and
   a clamping ring sized to extend around the tubular hub, said clamping ring having a unitarily formed and radially extending positioning lip at each end of wherein the positioning lips surround both of the mounting blocks of the tubular hubs secured to opposed pipe segments,
   wherein the hub and seal surround the pipe at a common longitudinal position therealong.

18. A system for coupling pipe segments endwise to each other comprising:
   a tubular hub securable annularly around and proximate to an end face of each pipe segment, each hub having a radially extending mounting block therearound;
   a clamping ring sized to extend around the tubular hub, said clamping ring having a radially extending positioning lip at each end of wherein the positioning lips surround the mounting blocks; and
   a seal positionable around the hubs between the mounting blocks, the seal comprising an outer cylindrical portion adapted to engage on the clamping ring, inner cylindrical portions engagable on a cylindrical portion of the tubular hubs and end portions engagable on the mounting blocks so as to form an angled path from the interior thereof,
   wherein the hub and seal surround the pipe at a common longitudinal position therealong.

19. A system for coupling pipe segments endwise to each other comprising:
   a tubular hub securable annularly around and proximate to an end face of each pipe segment, each hub having a radially extending mounting block therearound, each hub extending to an end face alignable with an end surface of each pipe segment;
   a seal positionable around the hubs between the mounting blocks; and
   a clamping ring sized to extend around the tubular hub, said clamping ring having a radially extending positioning lip at each end of wherein the positioning lips surround the mounting blocks,
   wherein the hub and seal surround the pipe at a common longitudinal position therealong.

* * * * *